(12) United States Patent
Benayoun et al.

(10) Patent No.: US 6,993,035 B2
(45) Date of Patent: Jan. 31, 2006

(54) SYSTEM FOR ROUTING DATA PACKETS THROUGH A CROSSBAR SWITCH IN EXPANSION MODE

(75) Inventors: Alain Benayoun, Cagnes/Mer (FR); Patrick Michel, La Gaude (FR); Gilles Toubol, Villeneuve Loubet (FR)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 09/683,231

(22) Filed: Dec. 4, 2001

(65) Prior Publication Data

US 2002/0110130 A1  Aug. 15, 2002

(30) Foreign Application Priority Data

Dec. 7, 2000  (EP) .................................. 00480112

(51) Int. Cl.
*H04L 12/28* (2006.01)
*H04L 12/56* (2006.01)

(52) U.S. Cl. .................... 370/401; 370/392; 370/395.1

(58) Field of Classification Search ................ 370/380, 370/389, 392, 396.1, 401, 413, 381, 382, 370/395.1, 395.31, 395.51; 375/316
See application file for complete search history.

(56) References Cited

U.S. PATENT DOCUMENTS

| 5,166,926 | A | * | 11/1992 | Cisneros et al. | ............. | 370/392 |
| 5,475,383 | A | * | 12/1995 | Ohta et al. | .................. | 370/382 |
| 5,689,500 | A | * | 11/1997 | Chiussi et al. | ............... | 370/235 |
| 5,864,553 | A | * | 1/1999 | Aramaki | ..................... | 370/392 |
| 5,867,663 | A | * | 2/1999 | McClure et al. | ............ | 709/234 |
| 6,144,635 | A | * | 11/2000 | Nakagawa | ................... | 370/229 |
| 6,501,734 | B1 | * | 12/2002 | Yu et al. | ..................... | 370/236 |

OTHER PUBLICATIONS

Allayer Communications, "Application Brief: Allayer Rox Bus Architecture", Aug. 1998, www.arl.wustl.edu/~jst/cse/577/docs/allayer.pdf.*

* cited by examiner

*Primary Examiner*—Afsar Qureshi
(74) *Attorney, Agent, or Firm*—Anthony J. Canale; Michael J. LeStrange

(57) ABSTRACT

The present invention describes a switching module for use either in port or speed expansion mode. The switching module is preferably used in a data transmission system consisting of a number of Local Area Networks LANs interconnected by a hub which includes a number of LAN adapters respectively connected to said LANs. A crossbar switch interconnects all LAN adapters and consists of switching modules having first receiving means for storing a first number of data packets; second receiving means for storing a second number of data packets; first outputting means for outputting a first subset of the first number of data packets and the second number of data packets; second outputting means for outputting a second subset of the first number of data packets; and switching means, coupled to the first and second receiving means and coupled to the first and second outputting means for routing the first and the second subsets of the first number of data packets and the second number of data packets to the respective first or second output means. The routing of the incoming data packets to their final destination is done without modifying the data packet header as a data packet sent by a source of adapter contains in its header the physical address of the destination adapter.

13 Claims, 9 Drawing Sheets

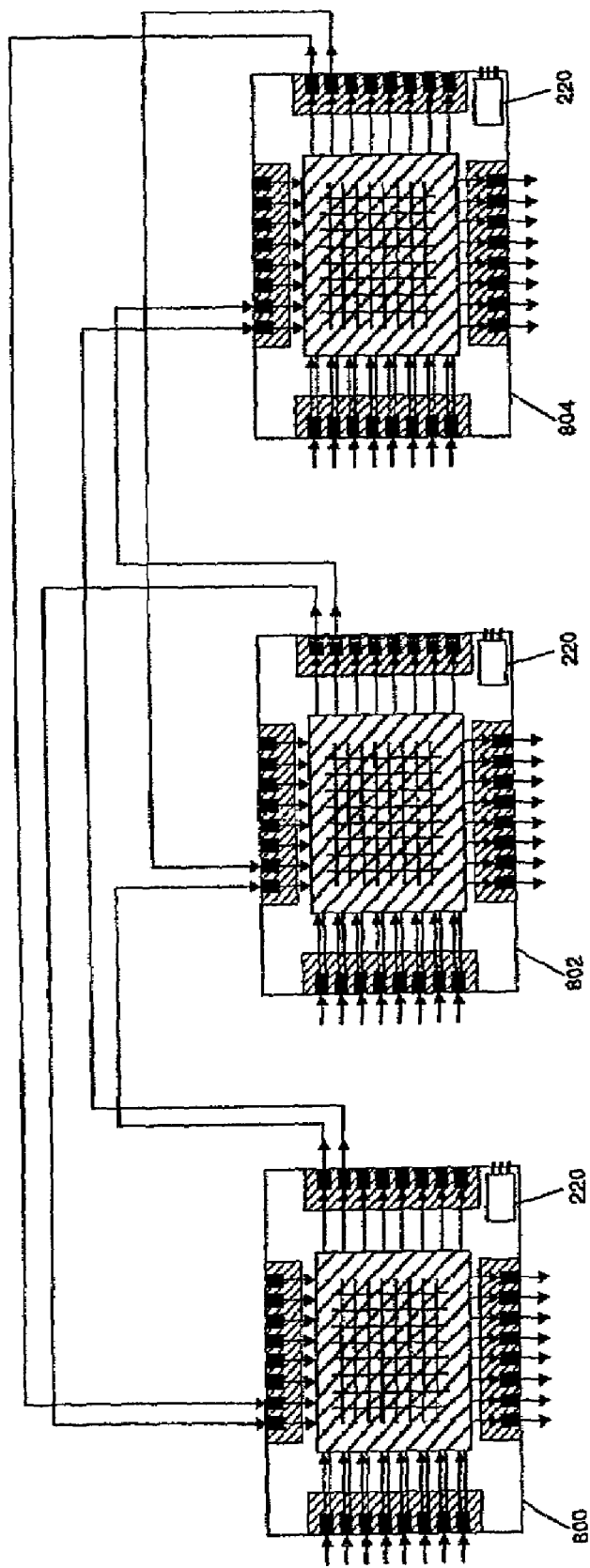

SYSTEM FOR ROUTING DATA PACKETS THROUGH A CROSSBAR SWITCH IN EXPANSION MODE

BACKGROUND OF THE INVENTION

1. Field of the Invention

The present invention relates to the transmission of data packets between Local Area Networks (LAN) interconnected by a crossbar switch and relates in particular to a system for transmitting LAN data packets through a crossbar switch.

2. Background of the Invention

Local Area Networks such as ethernet or token-ring, are generally interconnected together through hubs or bridges. The hub is a system made of LAN adapters that communicate together through a switch card. This switch card can be either a parallel bus or a passive switch card. Each data packet sent through the network has to follow a specific data path to reach its final destination. This process is generally known as the expansion mode process which is determinant for the high speed switches. In order to address this concern the prior art solutions are based on the use of a table routing located in front of the switch for rerouting the data packets coming from one port to another output port. Based on the table routing content, the mechanism allows to change the destination address of the incoming data packet in order to re-route this latter to the appropriate switch. In the prior art systems, it is necessary to change a specific field in the packet header to route the packet, and to repeat this replacement as much as it is required for the packet to reach its final destination, which is particularly constraining.

Therefore, it would be desirable to have a routing process and an associated system which overcome the drawbacks of the prior art systems.

BRIEF SUMMARY OF THE INVENTION

Accordingly, the object of the invention is to provide a system and method to route data packets to their final destination without modifying the packet's headers.

Another object of the invention is to provide a system for connecting several (LAN) adapters through a switch having the capability to be expandable both in ports and in speed.

The accomplishment of these and other related objects is achieved by a switching module consisting of first receiving means for storing a first number of incoming frames; second receiving means for storing a second number of frames; first outputting means for outputting a first subset of the first number of frames and the second number of frames; second outputting means for outputting a second subset of the first number of frames; and switching means, coupled to the first and second receiving means and coupled to the first and second outputting means for routing the first and the second subsets of the first number of frames and the second number of frames to the respective first or second output means.

Preferably, the switching module is used in port expansion mode in a data transmission system consisting of a number of Local Area Networks (LANs) interconnected by a hub which includes a number of LAN adapters respectively connected to said LANs. A crossbar switch interconnects all LAN adapters, and is characterized in that it comprises at least two switching modules of the type previously described and physically connected through a backplane.

A frame sent by an adapter to the crossbar switch is made of a number of data packets of fixed bytes size header. An incoming frame (Ethernet or Token Ring) is split within each adapter into a number of data packets having a fixed bytes size wherein one byte of each data packet contains the final destination address of the data packet. Preferably the frame is split into data packets of 54 bytes. The final destination address of each data packet contained in one byte is compared to a switch module address range assigned to the first switching module. If the address matches, the respective data packet is stored into an internal memory of the first switching module for further outputting to the appropriate LAN adapter. Otherwise, the respective data packet is stored into an expansion memory of the first switching module for further routing to the second switching module.

In the system of the present invention a data packet sent by an adapter initially contains in its header its final destination address which is the physical address of the destination switch. The header of the incoming data packet is first analyzed by the first switching module and either stored internally or routed to an expansion memory whether the data packet header matches the switch module address range or not.

BRIEF DESCRIPTION OF THE SEVERAL VIEWS OF THE DRAWINGS

The novel features believed to be characteristic of this invention are set forth in the appended claims. The invention itself, however, as well as these and other related objects and advantages thereof, will be best understood by reference to the following detailed description to be read in conjunction with the accompanying drawings.

FIGS. 8A and 8B show a preferred interconnection scheme between switches of the present invention.

DETAILED DESCRIPTION OF THE INVENTION

Figure 1:
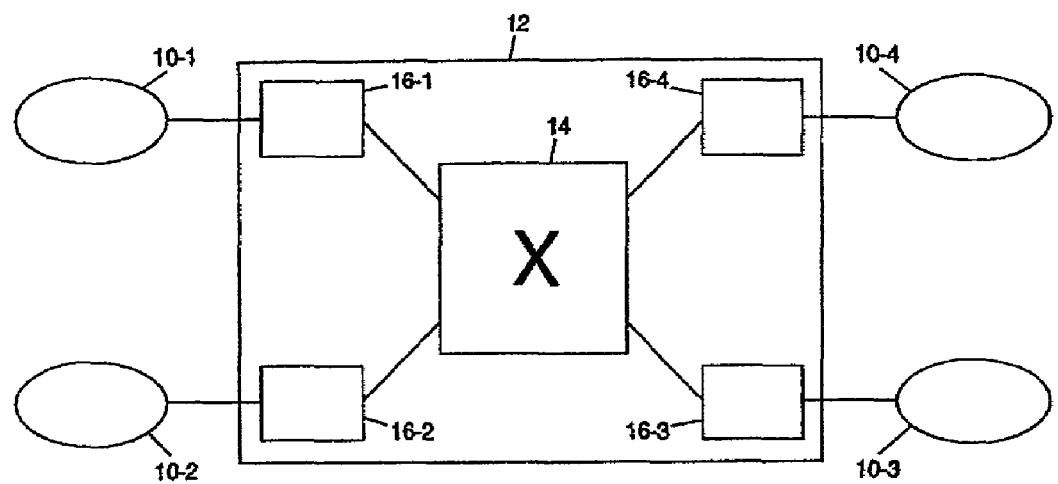
FIG. 1 shows a block diagram of a data transmission system including four LANs interconnected by a hub according to the present invention.

The invention is implemented in an environment illustrated in FIG. 1 where a number of Local Area Networks (LAN) 10-1, 10-2, 10-3, 10-4 are interconnected together by a hub 12 including an ATM crossbar switch 14 and the same number of LAN adapters (16-1, 16-2, 16-3, 16-4). The Local Area Networks may be of the type ATM, ethernet or token-ring. Each LAN is coupled to the switch module 14 by means of LAN adapter 16-1 for LAN 10-1, 16-2 for LAN 10-2, 16-3 for LAN 10-3 and 16-4 for LAN 10-4. Each LAN adapter is respectively connected to the switch module 14 by means of a data-input bus 13-1 to 13-4 and a data-output bus 15-1 to 15-4.

Figure 2:
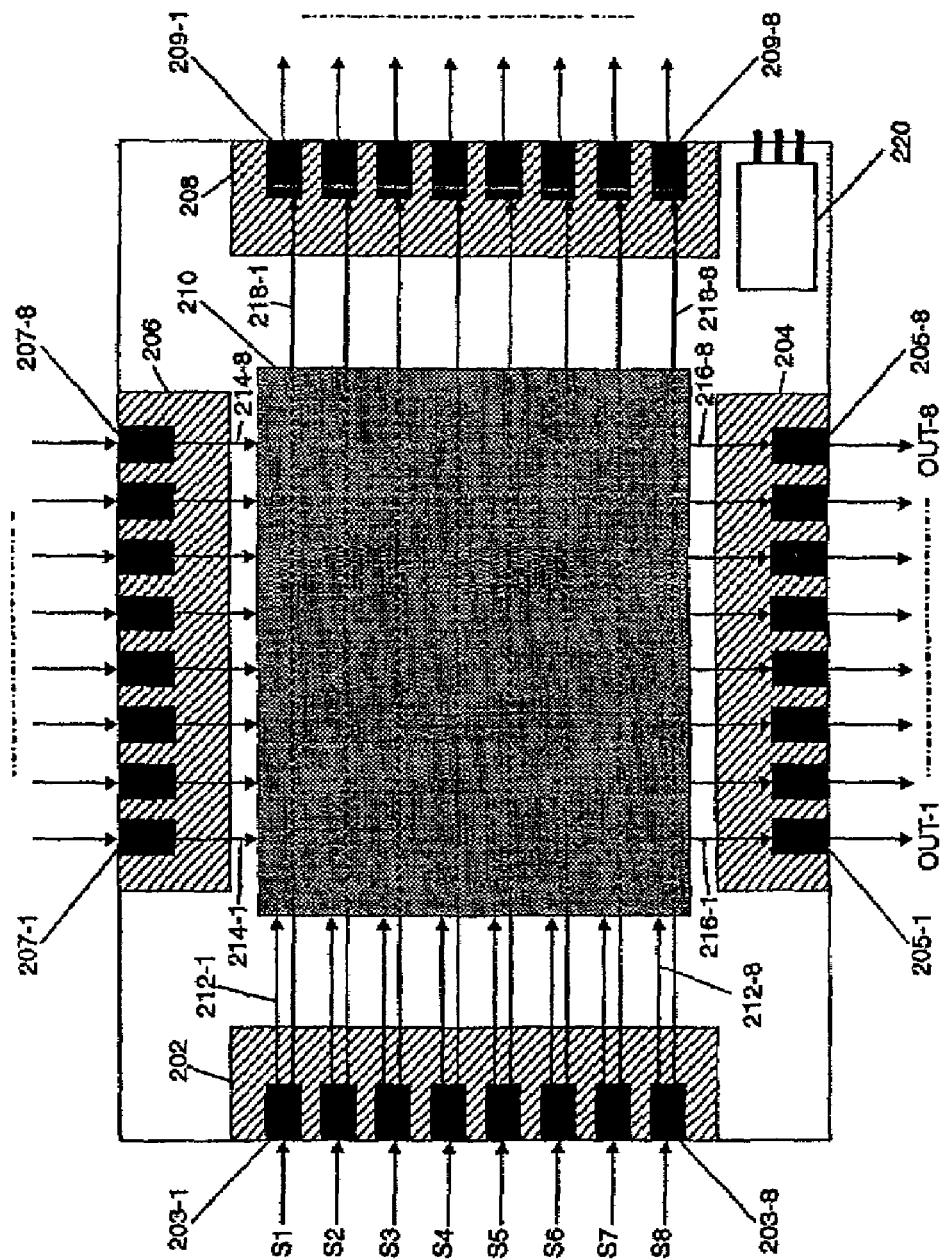
FIG. 2 shows a block diagram representing the main functions included in the switch module of the present invention.

Turning now FIG. 2, a block diagram representing the main functions included in the switch module of the present invention is described. The switch module 200 includes a select data_in logic function 202, a data_out logic function 204, an expansion data_in logic function 206, an expansion data_out logic function 208 and a crossbar data switch function 210.

The select data_in function 202 is made of eight identical "select data_in" logical blocks 203-1 to 203-8 for inputting incoming packets from LAN adapters on "data input buses" S1 to S8 and to be described in detail later with reference to FIG. 3.

The data_out function 204 is made of eight identical "data_out" logical blocks 205-1 to 205-8 for outputting packets on data output buses OUT_1 to OUT_8 and to be described in detail later with reference to FIG. 4.

The expansion data-in function 206 is made of eight identical "expansion data-in" logical blocks 207-1 to 207-8 for inputting expansion packets on "expansion data input buses" (EXPIN-1 to EXPIN-8) and to be described in detail later with reference to FIG. 5.

The expansion data_out function 208 is made of eight identical "expansion data-out" logical blocks (209-1 to 209-8) for outputting expansion packets on "expansion output buses" (EXPOUT-1 to EXPOUT-8) and to be described in detail later with reference to FIG. 6.

Figure 7:
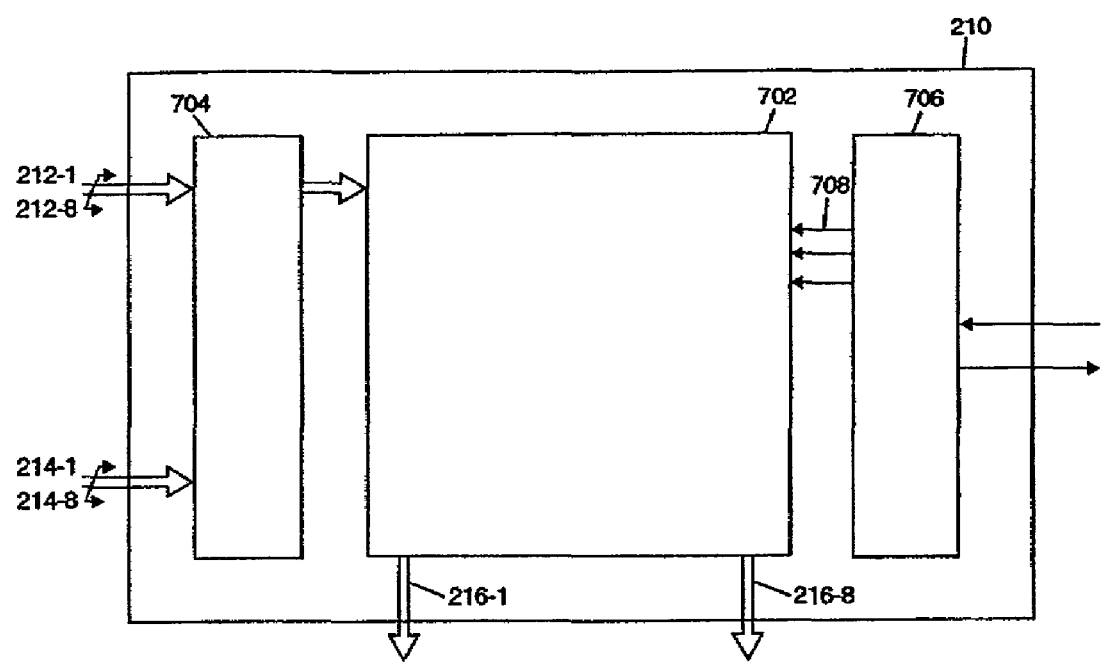
FIG. 7 shows a block diagram of the crossbar data switch circuit of the present invention.

The crossbar data switch block 210 which general function is to determine the appropriate data switching configuration and to be described in detail later with reference to FIG. 7 is connected to each individual logical block through internal buses: DATA_MUX_IN 212-1 to 212-8 from the select data-in blocks; EXP_MUX_IN 214-1 to 214-8 from the expansion data-in blocks; and SW_DATA_OUT 216-1 to 216-8 to the data-out blocks.

Finally the switch module 200 includes an address configuration range module 220 for predefining the expansion configuration of the switch module as it will be described later.

It should be noted that the present invention applies for any others organizations of the switch matrix such as a 4×4, an 8×8, or a 16×16.

Figure 3:
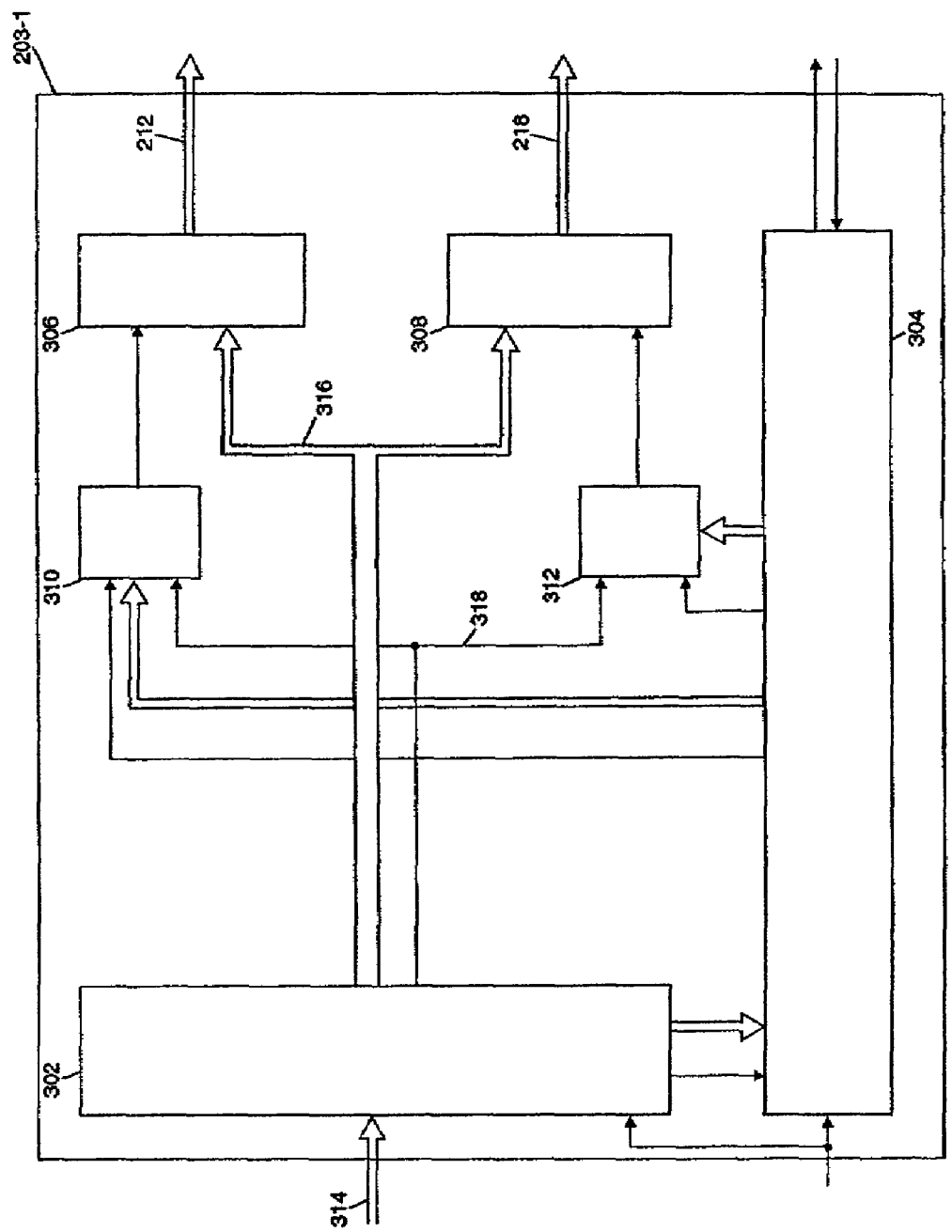
FIG. 3 shows a block diagram representing the select data_in interface circuit of the present invention.

FIG. 3 is a detailed block diagram of a select data_in logical circuit 203-1 of FIG. 2. The select data_in circuit 203-1 is made of a selector 302, a Finite State Machine circuit 304, an internal data memory circuit 306, an expansion memory circuit 308, an internal memory control circuit 310 and an expansion memory control circuit 312. Selector 302 receives incoming data packets through a data input bus 314 (DATA_IN) and outputs them through two output buses named as DATA_MUX_IN bus 212 and expansion data bus 218 (EXP_DATA_OUT). Data input bus 314 carries data from LAN adapters 16-1 to 16-4. Expansion data bus 218 carries data to expansion data_out blocks 209-1 to 209-8 and DATA_MUX_IN bus 212 carries data to crossbar data switch 210.

Selector 302 receives several data, clocks and control signals (several bus and control signals are shown on the FIG. without reference just for illustration as they are basic connections of such circuits) to perform the following functions which are not described in detail herein as they may be executed by common techniques which are not the aim of the invention. The main functions of selector 302 include determining the packet detection time through a synchronization packet signal SYNC; validating (signal 318) an incoming packet from a LAN adapter; and, based on the content of the packet header, routing the packet (on bus 316) to the expansion memory circuit 308 or to the internal data memory circuit 306.

The FSM logical block 304 performs the following tasks which again are not described in detail herein as they may be executed by common techniques which are not the aim of the invention. The main functions of FSM logical block 304 include receiving packet header detection 224 from selector 302; controlling the memory control circuits 310, 312; sending request_for_connection signals 221 to crossbar data switch 210; receiving grant_connection and acknowledging signals 222 from crossbar data switch 210; controlling the reading of the packets previously stored either into the internal memory or into the expansion memory according to the grant address; and, receiving a general_back_pressure signal 223 from crossbar data switch to inform of an overload of the storing modules to stop sending requests.

The internal memory control block 310 performs the following common tasks which again are not described in detail herein as they may be executed by common techniques which are not the aim of the invention. The main functions of memory control block 310 includes receiving valid_packet signal 318 from selector 302; controlling the write operations of packets coming from selector 302 into memory circuit 306; and, controlling the read operations from memory circuit 306 to the data mux in block over the DATA-MUX-IN bus 212.

Similarly to the previous description of memory control circuit 310, the main functions of expansion memory control circuit 312 include receiving valid packet signal 318 from selector 302; controlling the write operation of packets coming from selector 302 into expansion memory circuit 308; and, controlling the read operation of packets from the expansion memory circuit 308 to the expansion data out block over the EXP_DATA_OUT bus 218.

Finally, memory circuit 306 and expansion memory circuit 308 stores and outputs data packets under the control of the respective memory control circuits 310, 312.

Figure 4:
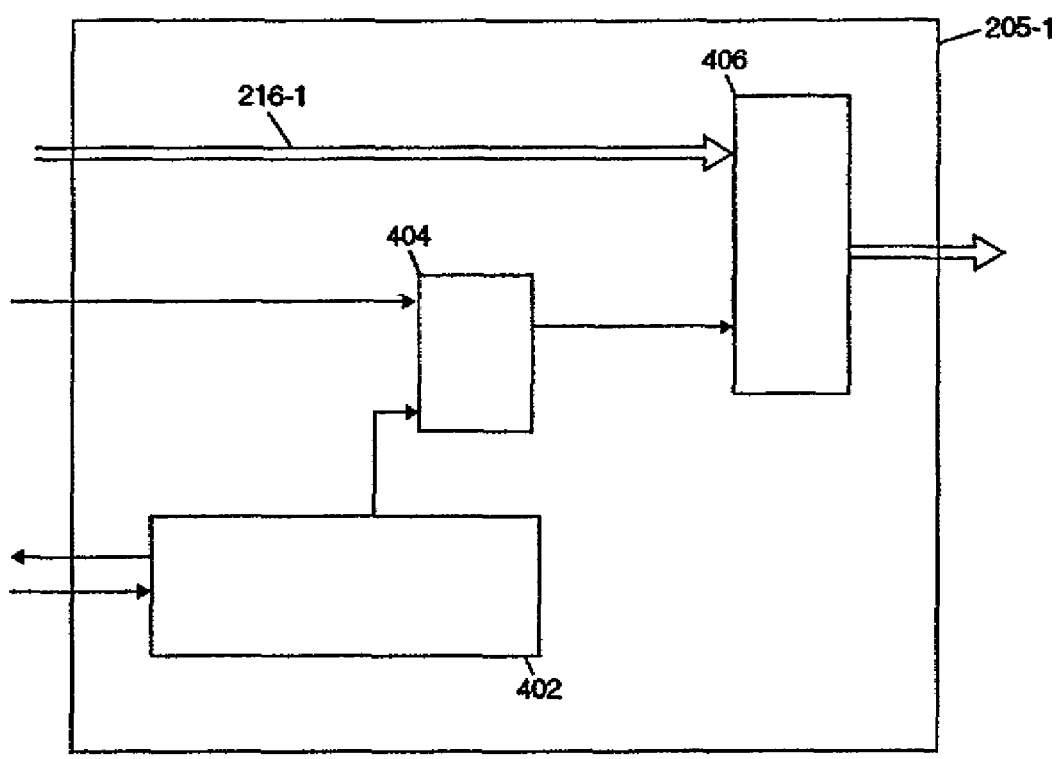
FIG. 4 shows a block diagram representing the data_out interface circuit of the present invention.

Referring now to FIG. 4, one data_out logical block 205-1 of the data_out function 204 is described. Data_out circuit 205-1 receives a Data out Switch bus (SW_DATA_OUT) 216-1, a Data_Transfer signal (Data_XFER) and outputs data on a Data_Out bus OUT_1.

The data_out logical block 205-1 includes a Finite State Machine circuit 402, a Memory control circuit 404 and a Data memory circuit 406. Data memory circuit 406 is connected to the crossbar data switch through the Data_Switch bus 216 to receive data from the select data-in blocks or the expansion data_in blocks. Memory control circuit 404 receives the Data Transfer signal (DATA_XFER) from the crossbar data switch and controls the Write/Read operations of the packets to/from data memory circuit 406. Finite State Machine 402 sends and receives various signals (a General_Back_Pressure signal 223, a Queue_Status signal 225, a Synchronization signal, an External_Back_Pressure signal 226 (EXT_BP)) to control the read operation of a packet to be sent, and to control the overload of the memory.

Figure 5:
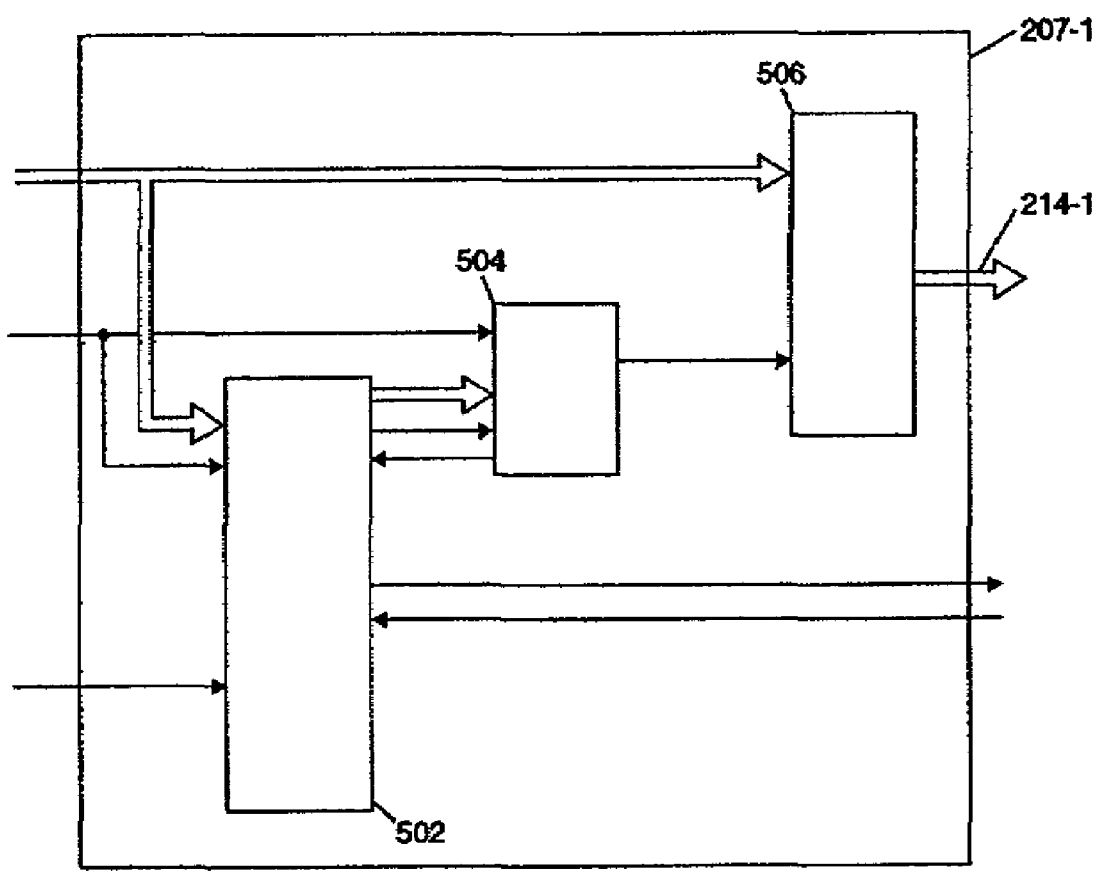
FIG. 5 shows a block diagram representing the expansion data_in interface circuit of the present invention.

Referring to FIG. 5, one expansion data_in circuit 207-1 will be described. Expansion data-in circuit receives data through an Expansion Data Input bus (EXPIN_1), and outputs data through an Expansion Multiplex Data Input bus 214-1 (EXP_MUX_IN). Again, expansion data-in circuit also receives and sends control signals.

The expansion data_in circuit 207-1 includes a Finite State Machine (FSM) 502, an expansion memory control circuit 504 and an expansion memory data circuit 506. The expansion memory control circuit 504 receives several signals to validate a data packet received from others switches modules 200, control the write operation of the incoming packet into the expansion memory circuit 506, control the read operation of packets from the expansion memory circuit 506 to the expansion mux in block over the "EXP_MUX_IN" bus 214, and control the expansion memory overflow. Finite State Machine circuit 502 receives and generates several control signals to send an Expansion_Request signal (EXP-REQ) to the crossbar data switch according to the header address of the incoming packet, generate the read address packet after reception of the Expansion_Grant signal (EXP-GRT) sent by the crossbar data switch, and control and generate the overflow mechanism.

Figure 6:
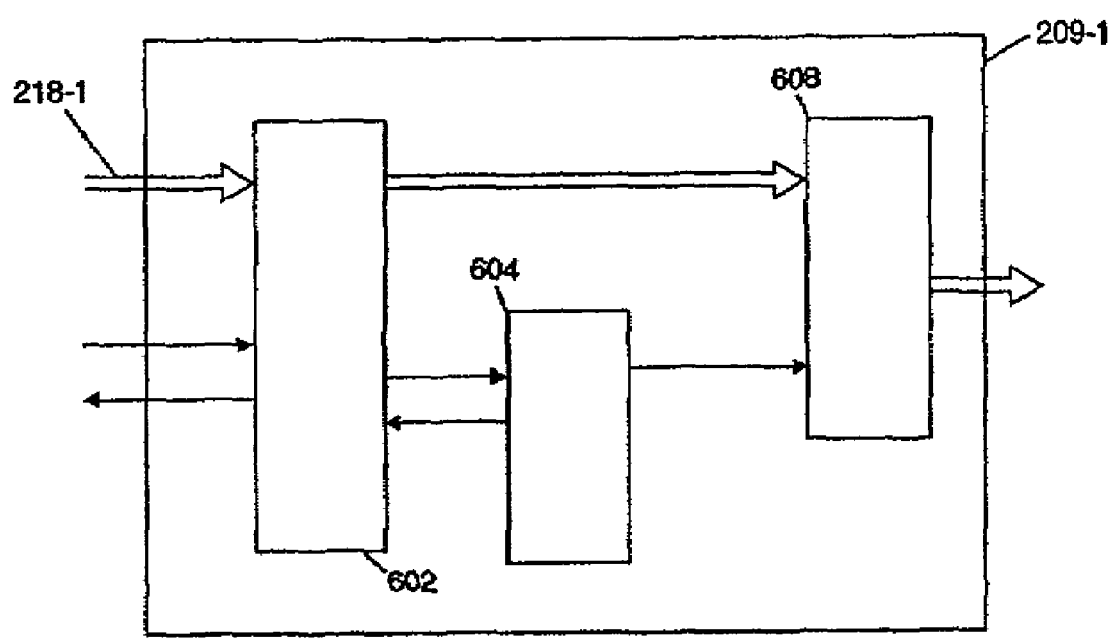
FIG. 6 shows a block diagram representing the expansion data_out interface circuit of the present invention.

Referring to FIG. 6, an expansion data_out circuit 209-1 is shown. The expansion data_out circuit consists of a control logic block 602, an expansion memory control block 604 and an expansion memory 608. The control logic circuit 602 receives data from a select data_in circuit 203-1 to 203-8 on expansion data out buses 218-1 to 218-8 and mainly performs the followings tasks: selects the available input of the expansion memory 608 where to store an incoming rerouted packet; validates the selection; controls the expansion overflow of the expansion memory; and, controls the general back pressure.

In the expansion mode (port or speed expansion), the output of the expansion data_out circuit is connected to a second switch module 200 by means of an expansion data_out bus (EXPOUT-1) in a way as it will be detailed with reference to FIGS. 8A and 8B.

FIG. 7 illustrates the crossbar data switch 210 of FIG. 2, and consists of a switching matrix 702, a multiplex data unit 704, and an algorithm unit 706. The Multiplex Data unit performs the multiplex operations between the buses issued from the select data_in circuit 203-1 to 203-8 and issued from the expansion data_in circuit 207-1 to 207-8 to grant one access. The switching matrix 702 operates under the control of the algorithm unit 706 which generates a bit combination on lines configuration 708 at each time period in order to configure the switching matrix. The bit combination set on the lines configuration 708 allows to address the data coming from the multiplex Data unit to the appropriate data_out circuit 205-1 to 205-8 on respective bus 216-1 to 216-8. The main functions of the algorithm unit 706 include receiving request signals to send data from both the select data_in block 202 and the expansion data_in block 206; granting the select data_in block 203-1 to 203-8 and/or the expansion data_in block 207-1 to 207-8; computing during each time period the configuration of the switching matrix for the next data output; and setting the lines configuration 708 based on the computation.

Figure 8B:
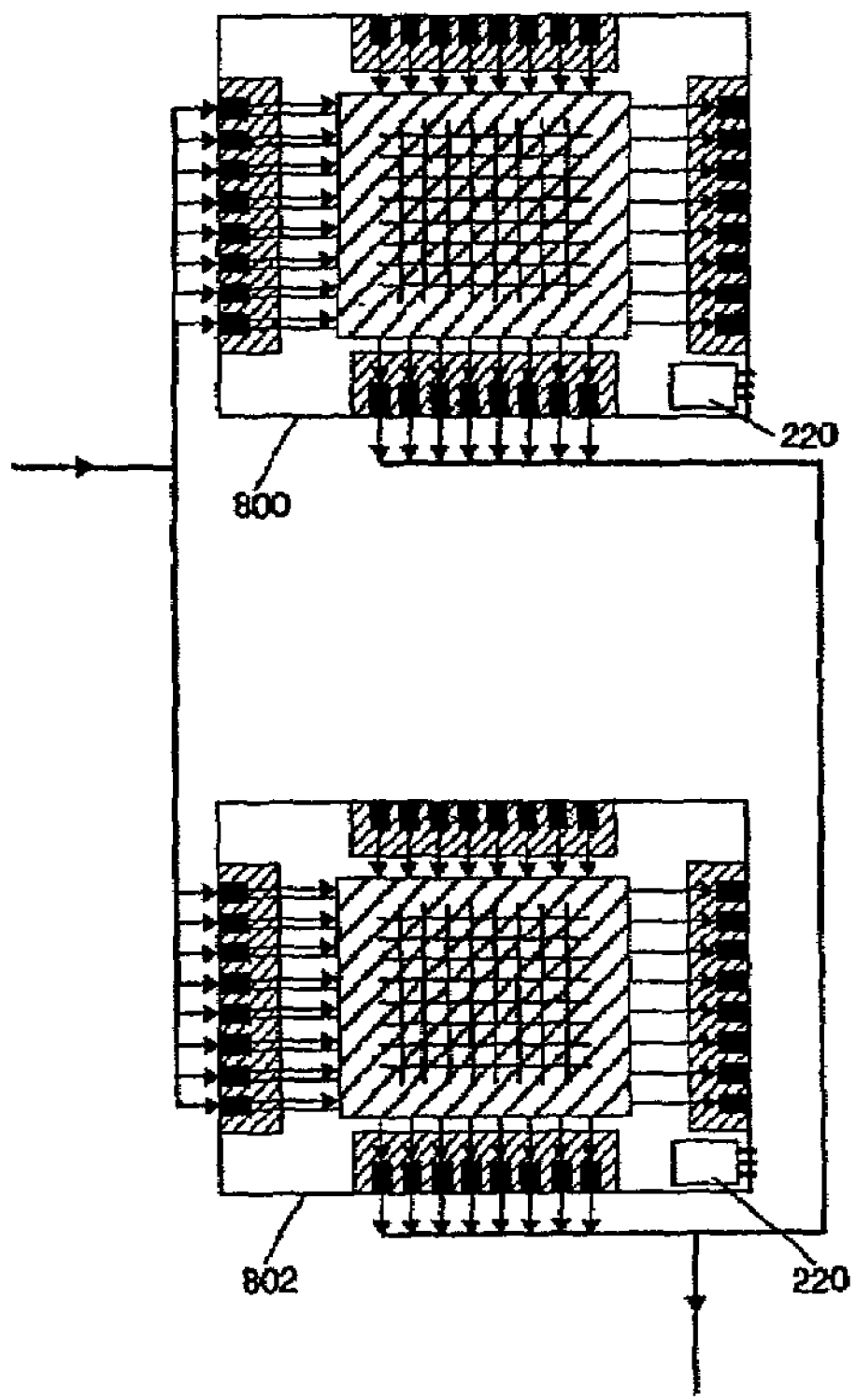

FIGS. 8A and 8B illustrate two implementations of port and speed expansion modes with the switch module of the invention. FIG. 8A is described but to those skilled in the art, the description will apply to FIG. 8B. FIG. 8A is a representation of a Port Expansion mode having 3 modules 800, 802, 804 where each module is connected to 8 LAN adapters S1–S8, S9–S16, S17–S24. In this example, the maximum number of LAN adapters supported by a card including the three modules is thus 24 LANs. First expansion output referenced 'Exp1_1' of first module 800 is connected to first expansion input of second module 802. Second expansion output 'Exp2_1' of first module 800 is connected to first expansion input of third module 804. Similarly, first expansion output 'Exp1_2' of second module 802 is connected to first expansion input of first module. Second expansion output 'Exp2_2' of second module is connected to second expansion input of third module 804. Finally, first expansion output 'Exp1_3' of third module 804 is connected to second expansion input of first module 800. Second expansion output 'Exp2_3' of third module 804 is connected to second expansion input of second module 802.

The above described scheme is an example and does not limit the scope of the invention to the described scheme. Other connection schemes with any other number of modules can also be used. With such a configuration of the input and output ports of the modules, the incoming packets are delivered to their destination address without the need of changing the destination packet address when it is necessary to change a switch module.

FIG. 8B illustrates the preferred implementation for a speed expansion mode to double the switch speed.

After a system power-on or a system reset, the data switch module initializes the set of address configuration range module 220 by reading the IO's range information of the range module which is done at card level. Referring to Table 1 and FIG. 8A which exemplifies a switch module with a 3 IO's pins configuration, configured at card level to indicate the range value covered by the corresponding switch module. It should be noted that the number of pins can be increased depending on the user requirements to cover a higher number of range values.

TABLE 1

| PIN Configuration | Range value |
|---|---|
| 0 0 0 | 0–7 for first switch module 800 |
| 0 0 1 | 8–15 for second switch module 802 |
| 0 1 0 | 16–23 for third switch module 804 |

A destination address of a packet is composed of eight bits wherein three bits are dedicated to the range comparison according to Table 2.

TABLE 2

| packet bits configuration 0 1 2 3 4 5 6 7 | packet destination address |
|---|---|
| 0 0 0 0 0 x x x | first module 800 |
| 0 0 0 0 1 x x x | second module 802 |
| 0 0 0 1 0 x x x | third module 804 |

At each synchronization pulse generated every 54 system clocks, the data switch module stores all the bytes of an incoming data packet. As already mentioned, the header byte of the data packet contains the destination address of the packet, and the other bytes are the data packet content. Next, the data switch module compares the packet destination address to its own address range, and then switches the packet to the appropriate destination which is either an internal storing location of a select data-out block 204 or an expansion storing location of an expansion data-out block 208.

If the destination address of an incoming packet is outside the range address of the corresponding module, then the module determines by a comparison of the different ranges, the correct expansion data-out block and switches the incoming packet to the corresponding expansion data-out block which will reroute the packet to its final destination in another switch module.

At each synchronization pulse, the switch module analyzes the destination address of each incoming packet (according to the IO's pins configuration as shown in locations 2,3, and 4 in Table 2) and compares it with its own range address as provided by the address configuration module 220 (Table 1). If the destination address falls within the range of the module. then the packet is output within a data-out block 204 of this latter, otherwise the packet is rerouted on the respective expansion data-out circuit 208 based on the packet bits configuration.

In the case where the bits configuration of the incoming packet is in the range of the corresponding module, then the select data-in circuit 203-1 to 203-8 receiving this incoming packet sends the packet to its internal memory 306 through the internal bus 316 as previously described with FIG. 3 and validates the incoming packet by setting the valid_packet signal 318.

Referring to FIG. 8A, consider as an example where the configuration is a 3-modules card connected together such as to be in the ports expansion mode and interconnecting 24 LAN's adapters. If the LAN adapter connected to port denoted 'S1' of first module 800 wants to send a frame to the LAN adapter connected to port 'Out-16' of second module 802, the LAN adapter splits the frame in '53+1=54' bytes packets wherein the header contains the final destination address ('Out-16' in the present example). The destination address byte of the packet incoming to port 'S1' of the first module is analyzed by the select data-in function and based on the configuration module reroutes the packet without the need of changing the destination switch module. In the present example the packet is rerouted to first expansion data-out block 209-1 of first module, and then sent to the first expansion data-in block 207-1 of second module where it is stored in the expansion memory 506 in order to be later processed by the crossbar mechanism of the crossbar data switch 210 of second module to be switched to the appropriated output. As soon as the packet is stored into the expansion memory of second module, the expansion mechanism sends a request for connection signal to the crossbar data switch in order to request a connection to port 'Out-16'. The crossbar sends back an acknowledge signal in order to inform that the connection will be established at the synchronization pulse. At the next synchronization pulse, the expansion-in function puts the appropriate data onto the expansion-mux-bus 214-1 and the packet is transferred through the crossbar data switch to the destination data-out block 205-8 to be sent finally to the connected LAN adapter.

Although specific embodiments of the present invention have been illustrated in the accompanying drawings and described in the foregoing detailed description, it will be understood that the invention is not limited to the particular embodiments described herein, but is capable of numerous rearrangements, modifications and substitutions without departing from the scope of the invention. The following claims are intended to encompass all such modifications.

What is claimed is:

1. A switching module to route ATM based data packets to an ultimate destination node without modification of a packet header, comprising:
   a first receiver which stores a first plurality of data packets in a first memory or a second memory integral to the first receiver;
   a second receiver which stores a second plurality of data packets in a first memory or a second memory integral to the second receiver;
   a first output which outputs a first subset of the first plurality of data packets and the second plurality of data packets;
   a second output which outputs a second subset of the first plurality of data packets; and
   a switch coupled to the first receiver and the second receiver and coupled to the first output and the second output for routing the first subset and the second subset to the respective first or second output.

2. The switching module of claim 1, wherein the first receiver further comprises a set of 'm' data-in circuits for receiving the first plurality of data packets from a plurality of LAN adapters, each data-in circuit further comprising:
   a first memory for storing the first subset of said first plurality of data packets, and a second memory for storing the second subset of said first plurality of data packets; and
   a selector for sending each received frame of said first plurality of data packets either to the first memory or the second memory.

3. The switching module of claim 2, wherein the data packets are sized as ATM data packets.

4. The switching module of claim 3, wherein the first output further comprises a set of 'p' data-out circuits for receiving the first subset of said first plurality of data packets and the second plurality of data packets, and wherein the switch further comprises a controller for configuring at each time period a plurality of address lines to route the first subset of said first plurality of data packets and the second plurality of data packets to the appropriate darn-out circuit according to a header byte configuration.

5. The switching module of claim 2, wherein the second output further comprises a set of 'n' expansion data-out circuits for receiving the second subset of said first plurality of data packets, each expansion data-out circuit further comprising:
   storage for storing the second subset of said first plurality of data packets received from the corresponding data-in circuit.

6. The switching module of claim 1 further comprising an address configuration for predefining the address range of the switching module.

7. The switching module of claim 6, wherein the address range of the switching module is a bit configuration to be compared to the module bit configuration of each incoming data packet.

8. A switching structure to route ATM based data packets to an ultimate destination node without modification of a packet header, comprising:
   two switching modules wherein the first and second switching modules include:
      a first receiver which stores a first plurality of data packets, in a first memory or a second memory integral to the first receiver;
      a second receiver which stores a second plurality of data packets, in a first memory or a second memory integral to the second receiver;
      a first output which outputs a first subset of the first plurality of data packets and the second plurality of data packets;
      a second output which outputs a second subset of the first plurality of data packets; and
      a switch coupled to the first receiver and the second receiver and coupled to the first output and the second output for routing the first subset and the second subset to the respective first or second output, and wherein a first expansion data-out circuit of the first switching module is connected to a first expansion data-in circuit of the second switching module, and a first expansion data-out circuit of the second switching module is connected to a first expansion data-in circuit of the first switching module.

9. A switching structure to route ATM based data packets to an ultimate destination node without modification of a packet header, comprising:
- two switching modules wherein the first and second switching modules include:
  - a first receiver having an integral memory which stores a first plurality of data packets, the first receiver being cross-connected to form a single receiver;
  - a second receiver having an integral memory which stores a second plurality of data packets;
  - a first output which outputs a first subset of the first plurality of data packets and the second plurality of data packets, the first output being cross-connected to form a single output;
  - a second output which outputs a second subset of the first plurality of data packets; and
  - a switch coupled to the first receiver and the second receiver and coupled to the first output and the second output for routing the first subset and the second subset to the respective first or second output, and wherein a first expansion data-out circuit of the first switching module is connected to a first expansion data-in circuit of the second switching module, and a first expansion data-out circuit of the second switching module is connected to a first expansion data-in circuit of the first switching module.

10. A data transmission system to route ATM based data packets to an ultimate destination node without modification of a packet header, comprising:
- a plurality of Local Area Networks interconnected by a hub including a plurality of LAN adapters respectively connected to said LANs and a crossbar switch interconnecting all LAN adapters wherein at least one of said LANs transmits a plurality of data packets to another one of said LANs through said crossbar switch, and wherein said crossbar switch comprises at least two switching modules, said switching modules comprising:
  - a first receiver which stores a first plurality of data packets in a first memory or a second memory integral to the first receiver;
  - a second receiver which stores a second plurality of data packets in a first memory or a second memory integral to the second receiver;
  - a first output which outputs a first subset of the first plurality of data packets and the second plurality of data packets;
  - a second output which outputs a second subset of the first plurality of data packets; and
  - a switch coupled to the first receiver and the second receiver and coupled to the first output and the second output for routing the first subset and the second subset to the respective first or second output.

11. The data transmission system of claim 10, wherein at least one of said LANs transmits a plurality of data frames to another one of said LANs through said crossbar switch, each frame comprising a plurality of data packets.

12. A method for routing a plurality of data packets to an ultimate destination node without modification of a packet header in a data transmission system having a plurality of Local Area Networks interconnected by a hub including a plurality of LAN adapters respectively connected to said LANs and a crossbar switch comprising at least two switching modules wherein the first and second switching modules comprise a first receiver which stores a first plurality of data packets in a first memory or a second memory integral to the first receiver, a second receiver which stores a second plurality of data packets in a first memory or a second memory integral to the second receiver, a first output which outputs a first subset of the first plurality of data packets and the second plurality of data packets, a second output which outputs a second subset of the first plurality of data packets, and a switch coupled to the first receiver and the second receiver and coupled to the first output and the second output for routing the first subset and the second subset to the respective first or second output, the crossbar switch interconnecting all LAN adapters and wherein at least one of said LANs transmits a plurality of data packets to another one of said LANs through said crossbar switch, each of said data packets having a fixed bytes size with one byte containing the respective final destination address, the method comprising the steps of:
- receiving the plurality of data packets within the first switching module;
- comparing the final destination address of each of said data packets to a switch module address range of the first switching module; and
- storing the corresponding data packet into an internal memory of the first switching module for further outputting to the appropriate LAN adapter if the final destination address matches, or storing the corresponding data packet in an expansion memory of the first switching module for further routing to the second switching module.

13. The method of claim 12 further comprising a first step of assigning a switch module address range to each switching module.

* * * * *